(12) United States Patent
Drake et al.

(10) Patent No.: US 7,328,571 B2
(45) Date of Patent: Feb. 12, 2008

(54) SEMI-AXISYMMETRIC SCRAMJET FLOWPATH WITH CONFORMAL NOZZLE

(75) Inventors: Alan Drake, Tequesta, FL (US); Daniel Guinan, Hobe Sound, FL (US)

(73) Assignee: United Technologies Corporation, Hartford, CT (US)

(*) Notice: Subject to any disclaimer, the term of this patent is extended or adjusted under 35 U.S.C. 154(b) by 291 days.

(21) Appl. No.: 10/999,602

(22) Filed: Nov. 29, 2004

(65) Prior Publication Data

US 2006/0112674 A1 Jun. 1, 2006

(51) Int. Cl.
*F02K 7/10* (2006.01)
*F02K 9/78* (2006.01)

(52) U.S. Cl. ............................ 60/204; 60/225; 60/768; 60/769; 102/377

(58) Field of Classification Search ................ 60/768, 60/769, 225, 245, 253, 204; 102/377, 378, 102/351
See application file for complete search history.

(56) References Cited

U.S. PATENT DOCUMENTS

| | | | | |
|---|---|---|---|---|
| 3,513,043 A | * | 5/1970 | Burnside | 149/19.3 |
| 3,727,409 A | * | 4/1973 | Kelley et al. | 60/768 |
| 3,901,028 A | * | 8/1975 | Leingang | 60/769 |
| 4,338,783 A | * | 7/1982 | Leingang | 60/768 |
| 4,841,724 A | * | 6/1989 | Hall et al. | 60/245 |
| 5,082,206 A | * | 1/1992 | Kutschenreuter et al. | 60/768 |
| 6,786,040 B2 | * | 9/2004 | Boehnlein et al. | 60/767 |
| 6,907,724 B2 | * | 6/2005 | Edelman et al. | 60/769 |

* cited by examiner

*Primary Examiner*—Ted Kim
(74) *Attorney, Agent, or Firm*—Bachman & LaPointe

(57) ABSTRACT

In accordance with a first aspect of the present invention, an aircraft having a scramjet engine is provided. The scramjet engine includes a flowpath which varies in three dimensions. In accordance with a second aspect of the present invention, a method for launching an aircraft having a scramjet engine with a nozzle section and a solid rocket booster positioned within the nozzle section is provided. The method includes the steps of igniting the solid rocket booster to accelerate the aircraft to a speed at which the scramjet engine can operate, clearing the nozzle section by ejecting the solid rocket booster from the nozzle section upon exhaustion of the solid rocket booster; and injecting fuel into a flow of air passing through the scramjet engine and igniting the fuel and the air to provide thrust to the aircraft.

18 Claims, 3 Drawing Sheets

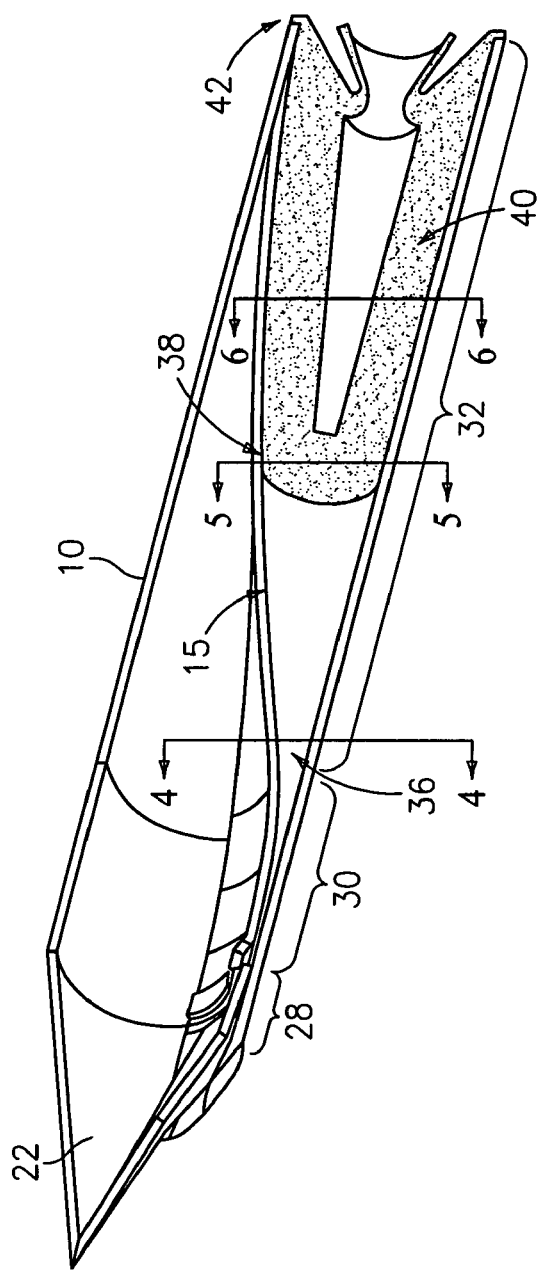
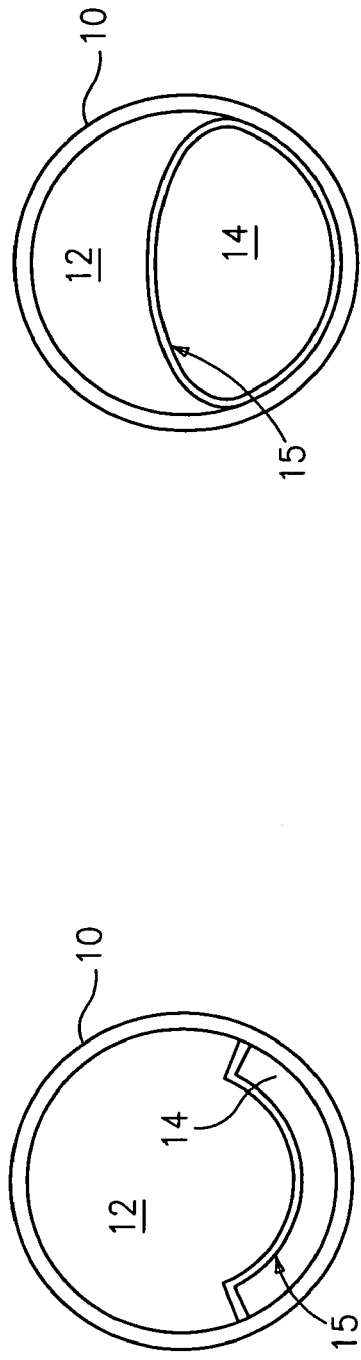

SEMI-AXISYMMETRIC SCRAMJET FLOWPATH WITH CONFORMAL NOZZLE

BACKGROUND OF THE INVENTION (1) Field of the Invention

The present invention relates to a system for packaging a scramjet engine having an inlet, an isolator, and a combustor in an aircraft fuselage such as a cylindrical missile body. The system is further characterized by the packaging of a solid propellant booster into the space occupied by a nozzle portion of the scramjet engine.

(b) Prior Art

For some time, there has been a desire for a missile that makes maximum use of a cylindrical volume whose maximum diameter is about 21 inches. Such a missile construction is desirable because the missile is compatible with surface and submarine launch platforms. The maximization of volumetric efficiency is important for the achievement of payload carrying capacity goals, as well as the ability to carry stored energy in the form of solid and liquid propellants, for maximization of range.

Scramjet flowpath configurations have been proposed and tested that have radial and circular flowpath features. Examples of this might include dual combustion ramjet and the inward turning flowfield configurations of Dr. Fred Billig.

There is a need for an improved scramjet flowpath configuration which allows more internal volume.

SUMMARY OF THE INVENTION

Accordingly, it is an object of the present invention to provide a scramjet engine for use in an aircraft having a flowpath which provides flow area and thrust potential at minimal cost to contiguous internal volume.

The foregoing object is attained by the present invention.

In accordance with a first aspect of the present invention, an aircraft having a scramjet engine is provided. The scramjet engine includes a flowpath which varies in three dimensions from an inlet portion to a nozzle section.

In accordance with a second aspect of the present invention, a method for launching an aircraft having a scramjet engine with a nozzle portion and a solid rocket booster positioned within the nozzle portion is provided. The method broadly comprises the steps of igniting the solid rocket booster to accelerate the aircraft to a speed at which the scramjet engine can operate, clearing the nozzle portion by ejecting the solid rocket booster from the nozzle portion upon exhaustion of the solid rocket booster; and injecting fuel into a flow of air passing through the scramjet engine and igniting the fuel and the air to provide thrust to the aircraft.

Other details of the semi-axisymmetric scramjet flowpath with conformal nozzle, as well as other objects and advantages attendant thereto, are set forth in the following detailed description and the accompanying drawings wherein like reference numerals depict like elements.

BRIEF DESCRIPTION OF THE DRAWINGS

FIG. 3 is a partial sectional view of an aircraft showing the flowpath configuration of the scramjet engine of the present invention;

FIG. 4 is a sectional view taken along section 4-4 of FIG. 3;

FIG. 5 is a sectional view taken along section 5-5 of FIG. 3;

DETAILED DESCRIPTION OF THE PREFERRED EMBODIMENT(S)

Figure 1:
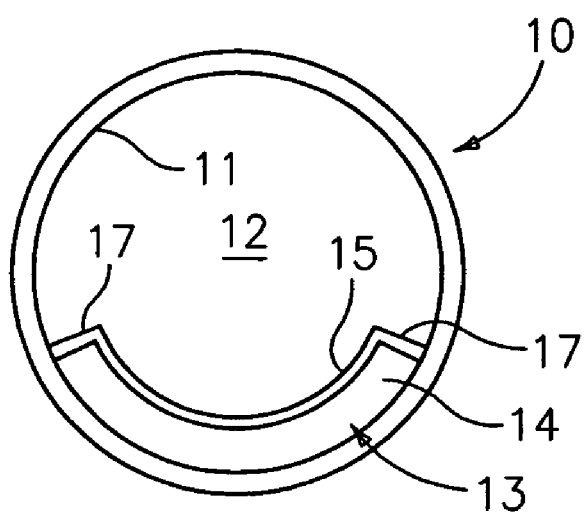
FIG. 1 is a cross-sectional view of an aircraft having a semiannular flowpath configuration.

Referring now to the drawings, FIG. 1 illustrates an aircraft 10, such as a missile, having an internal volume 12 and a scramjet engine 13 with a semiannular flowpath configuration 14. As will be discussed hereinafter, the flowpath configuration 14 of the scramjet engine 13 will vary in three dimensions to provide thrust potential at minimal cost to contiguous internal volume.

The internal volume 12 of the aircraft 10 may be used to house any desired component or components. The internal volume 12 is defined by the inner wall 11 of the aircraft body and the wall 15 which forms the flowpath 14 with the inner wall 11.

Figure 2:
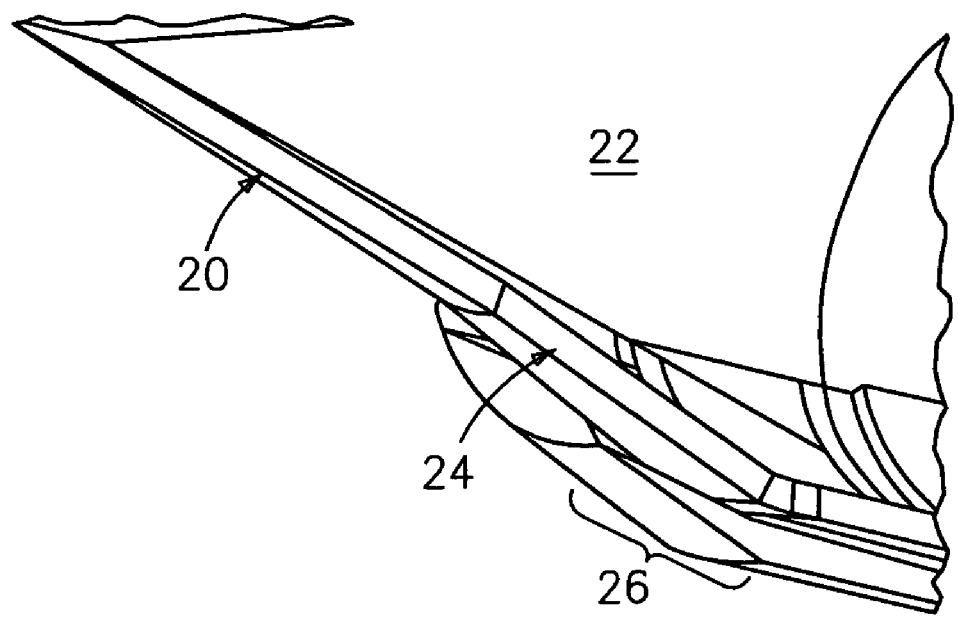
FIG. 2 is a perspective view of an inlet region of a scramjet engine used in the aircraft.

The present invention has four defining features which are best illustrated in FIGS. 2 and 3. The aircraft 10 has a semi-conical forebody 20 preferably attached to the underside of a conical nose portion 22 of the aircraft 10. The forebody 20 is contiguous with the conical nose portion 22. One or more conical ramps 24 at steeper angles leading to an inlet portion 26 of the scramjet engine 13 is provided.

The inlet portion 26 preferably has a semiannular shape, such as that shown in FIG. 1, and is defined as that portion of the flowpath configuration 14 aft of the cowl lip where the flowpath configuration 14 becomes closed and the direction of flow is turned to an axial direction. The semiannular shape of the inlet portion 26 is defined by the inner wall 11 and the wall 15 which has a central semiannular shape and two side walls 17.

The flowpath 14 of the scramjet engine 13 has a semi-annular scramjet isolator 28 located aft of the inlet portion 26 and a combustor 30 located aft of the isolator 28. The isolator or supersonic diffuser 28 is a device that is intended to accommodate back-pressure due to downstream combustion. In the combustor 30, fuel may be injected into the air flowing through the pathway 14. The fuel may be injected in any suitable manner known in the art using any suitable means (not shown) known in the art. Additionally, an ignitor (not shown) may be positioned in the vicinity of the combustor 30 to ignite the fuel-air mixture.

Referring now to FIG. 3, the scramjet engine 13 has a nozzle section 32. The nozzle section 32 has a continuation of wall 15 serving as an inner surface. The wall 15 varies in three dimensions from the semiannular inlet portion to a concave configuration (see FIG. 4) at the exit 36 of the combustor section 30 to a convex configuration (see FIG. 5) at an intermediate point 38 along the length of the nozzle section 32. By varying the shape of the wall 15 and thereby the shape of the flowpath 14 for the scramjet engine, it is possible to make optimal use of the internal volume 12.

Figure 6:
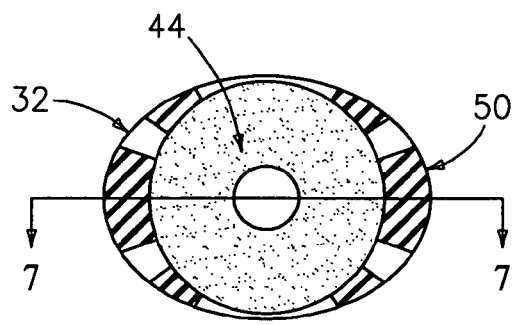
FIG. 6 is a sectional view taken along section 6-6 of FIG. 3.
Figure 7:
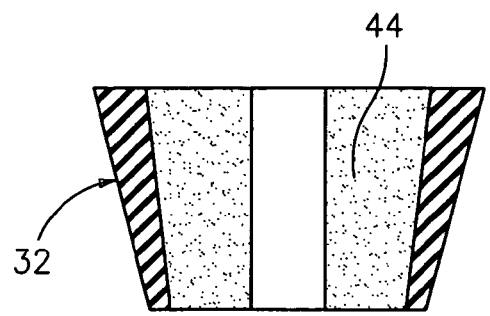
FIG. 7 is a sectional view taken along section 7-7 of FIG. 6.

In accordance with the present invention, referring now to FIGS. 3, 6 and 7, a solid rocket booster 40 is packaged with a separate casing into the space occupied by the nozzle section 32. The solid rocket booster 40 transmits thrust loads to the aircraft 10 via a flange 42 located at the rear of the booster 40. The booster 40 has a casing 44 which is circular at each axial station along its length, in order to efficiently absorb internal pressure loading on the booster case. Where the surrounding scramjet engine nozzle section 32 is not circular due to aerodynamic contouring requirements, detachable elastomeric pads 50 are preferably fitted to transmit pressure and vibratory loads from the solid rocket booster 40 to the scramjet nozzle section 32 and thus to the body of the aircraft 10. The pads 50 are preferably ejected along with the solid rocket booster 40.

Figure 8:
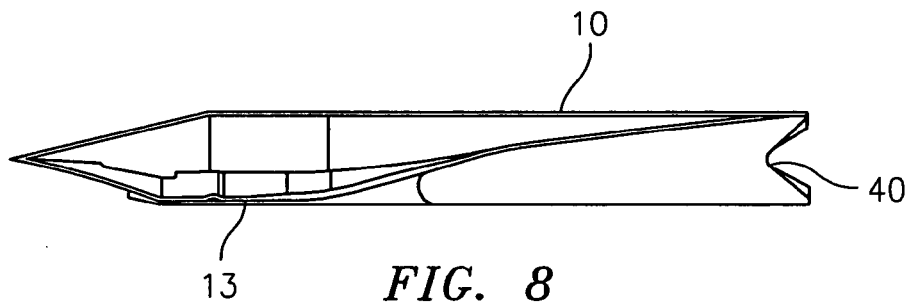
FIGS. 8-10 are schematic representation of the operation of the aircraft of the present invention.
Figure 9:
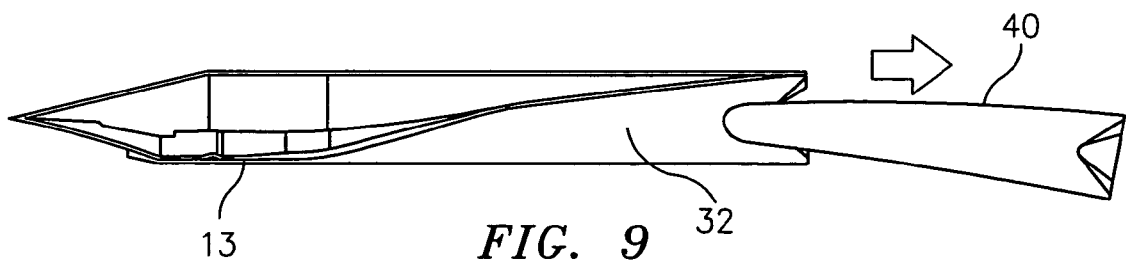
Figure 10:
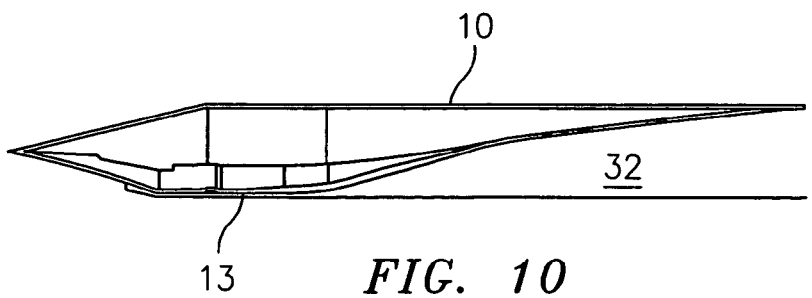

The operation of the scramjet engine in the context of a missile is shown in FIGS. 8-10 and is as follows. Upon launch of the aircraft/missile 10, the solid rocket booster 40 ignites, providing thrust to accelerate the aircraft 10 towards a speed at which the airbreathing scramjet engine 13 can operate. Additional external boosters (not shown) may be required to provide the necessary acceleration and may be attached to external surfaces of the aircraft/missile 10 in any suitable manner known in the art. Upon exhaustion of the internal solid rocket booster 40, the booster 40 is ejected rearwardly, clearing the scramjet nozzle section 32. Any suitable means known in the art may be used to eject the solid rocket booster 40 from the nozzle section 32. Upon ejection of the solid rocket booster 40, air begins to flow through the flowpath 14 of the scramjet engine 13. As previously discussed, fuel is preferably introduced into the airflow at one or more locations and ignition is accomplished using the ignitor. The scramjet engine 13 then provides thrust to complete the mission of the aircraft/missile 10.

It is apparent that there has been provided in accordance with the present invention a semi-axisymmetric scramjet flowpath with conformal nozzle which fully satisfies the objects, means, and advantages set forth hereinbefore. While the present invention has been described in the context of specific embodiments thereof, other alternatives, modifications, and variations will become apparent to those skilled in the art having read the foregoing description. Accordingly, it is intended to embrace those alternatives, modifications, and variations as fall within the broad scope of the appended claims.

What is claimed is:

1. An aircraft having an annular body forming an internal volume and a scramjet engine within said internal volume, said scramjet engine including a semiannular flowpath which varies in three dimensions from an inlet portion to a nozzle section, said flowpath being formed by a curved section of an inner wall of the aircraft body, an internal wall spaced from said inner wall, and two side walls within said internal volume extending between said internal wall and said inner wall, and said flowpath having a concave configuration at an inlet to said nozzle section, and said nozzle section having a convex curvature at an intermediate portion downstream of said inlet to said nozzle section.

2. An aircraft according to claim 1, wherein the inlet portion of said flowpath has a semiannular configuration.

3. An aircraft according to claim 1, further comprising a conical nose, a semi-conical forebody contiguous with said conical nose, and at least one conical ramp leading to the inlet portion.

4. An aircraft according to claim 1, further comprising a solid rocket booster positioned within said nozzle section.

5. An aircraft according to claim 4, wherein said solid rocket booster is ejectable.

6. An aircraft according to claim 4, further comprising a flange at a rear portion of the solid rocket booster for transmitting thrust loads to the aircraft.

7. An aircraft according to claim 4, wherein said solid rocket booster has a circular casing along its length for absorbing aerodynamic contouring requirements.

8. An aircraft according to claim 4, further comprising detachable elastomeric pads attached to a casing of said solid rocket booster for transmitting pressure and vibratory loads from said solid rocket booster to said nozzle section.

9. An aircraft according to claim 1, wherein said aircraft is a missile.

10. An aircraft having an annular body forming an internal volume and a scramjet engine within said internal volume, said scramjet engine including a semiannular flowpath being formed by a curved section of an inner wall of the aircraft body and an arcuately shaped internal wall spaced from said inner wall, and two side walls within said internal volume extending between said internal wall and said inner wall, and said flowpath varying in three dimensions from an inlet portion to a nozzle section, the inlet portion of said flowpath having a semiannular configuration, the flowpath having a concave configuration at an inlet to said nozzle section, wherein said nozzle section has a convex curvature at an intermediate portion downstream of said inlet to said nozzle section, and an expendable solid rocket booster positioned within said nozzle section.

11. An aircraft according to claim 1, wherein said scramjet engine has a combustor positioned between said inlet portion and said inlet to said nozzle section.

12. An aircraft according to claim 11, wherein said scramjet engine further has an isolator positioned between said combustor and said inlet portion.

13. An aircraft according to claim 10, further comprising said flowpath having a semi-annular means for accommodating back-pressure due to downstream combustion, said semi-annular means being located aft of the inlet portion, and a combustor located aft of the semi-annular means for accommodating said back-pressure.

14. An aircraft according to claim 10, wherein said internal wall serves as an inner surface of said nozzle section and varies in three dimensions from the semiannular inlet portion to a concave configuration at an exit of a combustor section to a convex configuration at an intermediate point along a length of the nozzle section.

15. An aircraft having a scramjet engine, said scramjet engine including a flowpath which varies in three dimensions from an inlet portion to a nozzle section, the inlet portion of said flowpath having a semiannular configuration, said flowpath having a concave configuration at an inlet to said nozzle section, a solid rocket booster positioned within said nozzle section, and detachable elastomeric pads attached to a casing of said solid rocket booster for transmitting pressure and vibratory loads from said solid rocket booster to said nozzle section, wherein said elastomeric pads are ejectable with said booster.

16. A method for launching an aircraft comprising the steps of:
   providing a scramjet engine having a semiannular flowpath configuration within an internal volume of an annular aircraft defined by an arcuately shaped inner wall and an arcuately shaped internal wall spaced from said arcuately shaped inner wall and joined to said inner wall by two side walls and having a nozzle section with an inlet and a convex curvature at an intermediate portion downstream of said inlet to said nozzle section;

positioning an expendable solid rocket booster within said nozzle section;

igniting said solid rocket booster to accelerate the aircraft to a speed at which said scramjet engine can operate;

clearing said nozzle section by ejecting said solid rocket booster from said nozzle section upon exhaustion of said solid rocket booster; and injecting fuel into a flow of air passing through said scramjet engine and igniting said fuel and said air to provide thrust to said aircraft.

17. The method according to claim 16, further comprising:

attaching detachable elastomeric pads to a casing of said solid rocket booster for transmitting pressure and vibratory loads from said solid rocket booster to said nozzle section.

18. The method for launching an aircraft comprising the steps of:

providing a scramjet engine having a nozzle section with an inlet and a convex curvature at an intermediate portion downstream of said inlet to said nozzle section;

positioning a solid rocket booster within said nozzle section;

igniting said solid rocket booster to accelerate the aircraft to a speed at which said scramjet engine can operate;

clearing said nozzle section by ejecting said solid rocket booster from said nozzle section upon exhaustion of said solid rocket booster;

injecting fuel into a flow of air passing through said scramjet engine and igniting said fuel and said air to provide thrust to said aircraft;

attaching detachable elastomeric pads to a casing of said solid rocket booster for transmitting pressure and vibratory loads from said solid rocket booster to said nozzle section; and ejecting said detachable elastomeric pads with said booster.

* * * * *